(12) United States Patent
Amsili et al.

(10) Patent No.: US 11,551,565 B2
(45) Date of Patent: Jan. 10, 2023

(54) SYSTEM AND METHOD FOR DRONE RELEASE DETECTION

(71) Applicant: PEARLS OF WISDOM ADVANCED TECHNOLOGIES LTD, Netanya (IL)

(72) Inventors: Shay Amsili, Netanya (IL); Shay Itzhak Sevet, Netanya (IL); Michel Roee Chen, Netanya (IL)

(73) Assignee: PEARLS OF WISDOM ADVANCED TECHNOLOGIES LTD, Netanya (IL)

( * ) Notice: Subject to any disclaimer, the term of this patent is extended or adjusted under 35 U.S.C. 154(b) by 0 days.

(21) Appl. No.: 17/493,862

(22) Filed: Oct. 5, 2021

(65) Prior Publication Data

US 2022/0028286 A1 Jan. 27, 2022

Related U.S. Application Data

(63) Continuation of application No. PCT/IL2020/050448, filed on Apr. 16, 2020.

(30) Foreign Application Priority Data

Apr. 18, 2019 (IL) .......................................... 266249

(51) Int. Cl.
*G08G 5/00* (2006.01)
*B64C 39/02* (2006.01)
(Continued)

(52) U.S. Cl.
CPC ......... *G08G 5/0065* (2013.01); *B64C 39/024* (2013.01); *G08G 5/003* (2013.01); *B64C 2201/12* (2013.01); *B64C 2201/20* (2013.01)

(58) Field of Classification Search
CPC ........ G08G 5/0065; G08G 5/003; G08G 5/00; B64C 39/024; B64C 2201/12;
(Continued)

(56) References Cited

U.S. PATENT DOCUMENTS 9,387,928 B1 7/2016 Gentry et al.
9,758,301 B2 9/2017 Porat
(Continued)

FOREIGN PATENT DOCUMENTS

EP 3342715 A1 7/2018
GB 2553604 A 3/2018
(Continued)

OTHER PUBLICATIONS

B Drone—http://www.dubaidesignweek.ae/global-grad-show/projects/b-drone/on Jul. 8, 2018 at 13:00.
(Continued)

*Primary Examiner* — Yonel Beaulieu (57) ABSTRACT

A system comprising: one or more Unmanned Aerial Vehicles (UAVs); and a UAV carrier configured to carry the UAVs from an origin to a destination; wherein the UAV carrier comprises a first controller configured to release the UAVs from the UAV carrier; and wherein each of the UAVs comprises: one or more motors configured to generate, directly or indirectly, a lift, lifting the UAV; and a second controller, configured to: activate at least one of the motors upon fulfilment of one or more conditions, thereby generating the lift, wherein after the release of the respective UAV and before the activation of the at least one motor of the respective UAV the motors of the respective UAV are inactive.

11 Claims, 3 Drawing Sheets

(51) Int. Cl.
*B64D 5/00* (2006.01)
*G05D 1/00* (2006.01)

(58) Field of Classification Search
CPC .......... B64C 2201/20; B64C 2201/141; B64C 39/02; B64C 2201/08; B64D 5/00; G05D 1/0669; G05D 1/104; G05D 1/0011; G05D 1/00
See application file for complete search history.

(56) References Cited

U.S. PATENT DOCUMENTS

| | | | |
|---|---|---|---|
| 9,841,757 B2* | 12/2017 | Mikan | .................. G08G 5/0069 |
| 10,013,886 B2 | 7/2018 | Blomberg | |
| 10,346,789 B1* | 7/2019 | Berg | .......... B64B 1/00 |
| 2005/0151000 A1* | 7/2005 | Dodu | ...................... F42B 10/14 244/3.24 |
| 2009/0205845 A1 | 8/2009 | Hoffman | |
| 2013/0233964 A1* | 9/2013 | Woodworth | ............ B64C 25/58 244/175 |
| 2015/0041598 A1 | 2/2015 | Nugent | |
| 2016/0062364 A1 | 3/2016 | Foinet et al. | |
| 2016/0179096 A1* | 6/2016 | Bradlow | .............. G05D 1/0094 701/8 |
| 2016/0214717 A1* | 7/2016 | De Silva | ................. B64D 5/00 |
| 2016/0304217 A1 | 10/2016 | Fisher et al. | |
| 2017/0085840 A1 | 3/2017 | Mizushina et al. | |
| 2017/0129603 A1* | 5/2017 | Raptopoulos | ........ G08G 5/0069 |
| 2017/0316701 A1* | 11/2017 | Gil | ...................... G06Q 10/083 |
| 2017/0355469 A1 | 12/2017 | Canning | |
| 2017/0369169 A1 | 12/2017 | Lee et al. | |
| 2018/0356841 A1 | 12/2018 | Zilberstein et al. | |

FOREIGN PATENT DOCUMENTS

| | | | |
|---|---|---|---|
| JP | 2015018932 A | 11/2015 | |
| KR | 20170019684 A1 | 2/2017 | |
| KR | 20180031622 B1 | 3/2018 | |
| KR | 200486515 Y1 | 5/2018 | |
| WO | WO2014080386 A2 | 5/2014 | |
| WO | WO-2017090040 A1 * | 6/2017 | ........... A62C 3/0242 |
| WO | WO2018002775 A1 | 1/2018 | |
| WO | WO2018051337 A1 | 3/2018 | |
| WO | WO-2020144689 A1 * | 7/2020 | ............... B64D 5/00 |

OTHER PUBLICATIONS

Han, K.S.A., 2017, Test and Evaluation of an Image-Matching Navigation System for a UAS Operating in a GPS-Denied Environment, Specifically look at: Section 3.3.1 (pp. 23-24).

Conte, G. and Doherty, P., Mar. 2008—An Integrated UAV Navigation System Based on Aerial Image Matching. In Aerospace Conference, 2008 IEEE (pp. 1-10). * Specifically look at: Section 5 (pp. 5-6).

Jo, Seunghwan, Lee, B., Oh, J., Song, J., Lee, C., Kim, S. and Suk, J. :"Experimental Study of In-Flight Deployment of a Multicopter from a Fixed-Wing UAV". International Journal of Aeronautical and Space Sciences, 20(3), pp. 697-709, (Feb. 25, 2019).

* cited by examiner

SYSTEM AND METHOD FOR DRONE RELEASE DETECTION

TECHNICAL FIELD

The invention relates to an Unmanned Aerial Vehicle (UAV) carrier and to a system and method for drone release detection.

BACKGROUND

UAVs are commonly used nowadays to take part or to accomplish various missions or tasks that in the past required manned aircrafts. These missions may include civilian missions, such as: disaster relief, archeology, conservation (pollution monitoring, anti-poaching, etc.), law enforcement, and anti-terrorism missions. Commercial missions, such as: aerial surveillance, filmmaking, journalism, scientific research, surveying, cargo transport, and agriculture and many other relevant missions, that can be accomplished by an unmanned aircraft.

The UAVs may be fully autonomous in fulfilling their missions, they may be remotely piloted UAVs, controlled by human controllers from afar or they may have partial autonomous capabilities, requiring human intervention in some aspects of their mission.

Due to limitations in the amount of energy and in mission flight time of many UAVs, there is a need to carry one or more UAVs to a geographical vicinity of a mission area, thereby eliminating the need for the UAVs to fly by consuming their own limited powers to the mission area. There is thus a need for a UAV carrier. In addition, there is a need for a mechanism allowing the UAVs to recognize their release from the UAV carrier and to subsequently activate their motors in order to navigate to a target within the mission area and to realize their tasks.

There is thus a need in the art for a new UAV carrier that will be able to transport one or more UAVs to their mission area and enable the recognition by the UAVs of their release from the UAV carrier to start their mission.

It is to be noted that the terms UAV and drone are used herein interchangeably.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 10,013,886 (Blomberg el al.) published on Jul. 3, 2018, discloses a method comprising receiving a task set comprising multiple tasks, receiving operational information identifying one or more operating characteristics of multiple drones, and obtaining an initial heuristic ordering of the multiple tasks based on the operational information and the climate information. Each task has a corresponding task location. The method further comprises scheduling the multiple tasks to obtain a final ordering of the multiple tasks. The final ordering represents an order in which the multiple tasks are scheduled, and the final ordering may be different from the initial heuristic ordering.

B DRONE, captured from "http://www.dubaidesignweek.ae/global-grad-show/projects/b-drone/" on Aug. 7, 2018 at 13:00, discloses an earthquake rescue system designed to optimize the first 72 hours of search time. This high-risk period, also known as the 'Golden Time,' is largely responsible for the high mortality rates of both victims and rescue operatives. The B Drone system proposes the use of unmanned aerial drones to carry out these hazardous initial searches. The drone-in-drone system pairs each mother drone with a smaller interior drone, deployed to navigate small gaps and cramped spaces, unreachable or dangerous to the human worker. With real-time GPS, a built-in 4K camera and an infrared heating sensor, the B Drone increases the chances of victim location, while reducing unnecessary risks to rescue workers.

U.S. Pat. No. 9,841,757 (Mikan el al.) published on Dec. 12, 2017, discloses a system for providing drone piggybacking on vehicles is disclosed. In particular, the system may enable drones or other unmanned mobile connected devices to piggyback onto various types of hosts, such as vehicles, in a symbiotic fashion. Through the symbiotic relationship created between the drones and hosts, the drones may utilize the hosts as a means for transport, such as while delivering a good to an intended destination, and the hosts may receive certain incentives in exchange for transporting the drones. Drones may be paired with hosts based on any number of factors, such as whether the host is traveling on a route that corresponds with reaching the intended destination, whether the host is capable of recharging the drone, and whether the drone has sufficient power to reach the intended destination. By enabling drones to piggyback with hosts, the required traveling range for a drone may be reduced.

US Patent application No. 2017/0316701 (Gil et al.) published on Nov. 2, 2017, discloses systems and methods that include UAVs that serve to assist carrier personnel by reducing the physical demands of the transportation and delivery process. A UAV generally includes a UAV chassis including an upper portion, a plurality of propulsion members configured to provide lift to the UAV chassis, and a parcel carrier configured for being selectively coupled to and removed from the UAV chassis. UAV support mechanisms are utilized to load and unload parcel carriers to the UAV chassis, and the UAV lands on and takes off from the UAV support mechanism to deliver parcels to a serviceable point. The UAV includes computing entities that interface with different systems and computing entities to send and receive various types of information.

US Patent application No. 2016/0062364 (Foinet et al.) published on Mar. 3, 2016, discloses a new method of dynamic control of a rotary-wing drone in throw start includes the steps of: a) initializing a predictive-filter altitude estimator; b) the user throwing the drone in the air with the motors turned off; c) detecting the free fall state; d) upon detecting the free fall state, fast start with turn-on of the motors, open-loop activation of the altitude control means, and closed-loop activation of the attitude control means; e) after a motor response time, stabilizing the drone by closed-loop activation of the altitude control means, and closed-loop activation of the attitude control means; f) detecting a stabilization state such that the total angular speed of the drone is lower than a predetermined threshold; and g) upon detecting the stabilization state, switching to a final state in which the drone is in a stable lift condition and pilotable by the user.

US Patent application No. 2016/0179096 (Bradlow et al.) published on Jun. 23, 2016, discloses an unmanned aerial vehicle (UAV) copter for consumer photography or videography can be launched by a user throwing the UAV copter into mid-air. The UAV copter can detect that the UAV copter has been thrown upward w % bile propeller drivers of the UAV copter are inert. In response to detecting that the UAV copter has been thrown upward, the UAV copter can compute power adjustments for propeller drivers of the UAV copter to have the UAV copter reach a predetermined elevation above an operator device. The UAV copter can then supply power to the propeller drivers in accordance with the computed power adjustments.

US Patent application No. 2017/0085840 (Mizushina et al.) published on Mar. 23, 2017, discloses an information gathering apparatus includes an information acquisition sensor unit to acquire information and a propelling system to fly in air. The information gathering apparatus includes a supporting unit and a controller. The supporting unit supports the propelling system in the first and second configurations. The controller moves the supporting unit such that the supporting unit supports the propelling system in the second configuration after the information gathering apparatus is thrown up in a state where the supporting unit supports the propelling system in the first configuration.

European Patent application No. 3342715 (Lee) published on Jul. 4, 2018, discloses a drone according to an embodiment may comprise: a support table; a main unit spaced from the support table and formed above the support table; a connecting portion for connecting the main unit and the support table; and a propulsion unit provided on the outer side of the support table so as to generate thrust. The main unit may have a through-hole formed therein, a parachute may be provided inside the through-hole, and, during a fall, the parachute may be discharged out of the through-hole by deformation of the connecting portion.

US Patent application No. 2017/0355469 (Canning) published on Dec. 14, 2017, discloses a falling drone warning apparatuses and methods are disclosed. The apparatus may be attached to a drone and may measure acceleration during the drone's operation in order to ascertain whether the drone is free falling. If the apparatus detects that the drone is free falling, the apparatus may activate an audible alarm to warn people on the ground of the potential danger and to afford them the opportunity to take action to avoid the drone's impact or minimize its effect.

Han, K. S., 2017. Test and Evaluation of an Image-Matching Navigation System for a UAS Operating in a GPS-Denied Environment. Naval Postgraduate School, Monterey, United States, discloses that Without corrective updates from the Global Positioning System, navigational capabilities are degraded significantly when the inertial navigation system becomes the only source of an unmanned aerial vehicle's movement estimate. Today, unmanned aerial vehicles are easily equipped with a variety of passive sensors, such as video cameras, due to their increasingly lower prices and improvements in sensor resolution. The concept of using an image matching technique on an input video camera stream was demonstrated earlier with real flight data using a single low-grade onboard sensor. This technique works by matching the stream of data from the camera with a pre-stored depository of geo-referenced reference images to estimate the current attitude and position of an unmanned aerial vehicle (UAV). Preliminary results indicated that unfiltered position estimates can be accurate to the order of roughly 100 meters when flying at two kilometers above the surface and unfiltered orientation estimates are accurate to within a few degrees. This thesis examines developed algorithms on a suite of video data, seeking to reduce the errors in estimating attitude and position of a UAV. The data sets collected at King City and Camp Roberts, Calif. are also studied to discover the effect of altitude, terrain pattern, elevation map, light conditions, age of reference data and other parameters on estimation. This thesis concludes that in the absence of other sources of navigational information, imagery from a camera is a viable option to provide positional information to a UAV.

Conte, G. and Doherty, P., 2008, March. An integrated UAV navigation system based on aerial image matching. In Aerospace Conference, 2008 IEEE (pp. 1-10). IEEE, discloses exploring the possibility of using geo-referenced satellite or aerial images to augment an Unmanned Aerial Vehicle (UAV) navigation system in case of GPS failure.

A vision-based navigation system which combines inertial sensors, visual odometer and registration of a UAV on-board video to a given geo-referenced aerial image has been developed and tested on real flight-test data. The experimental results show that it is possible to extract useful position information from aerial imagery even when the UAV is flying at low altitude. It is shown that such information can be used in an automated way to compensate the drift of the UAV state estimation which occurs when only inertial sensors and visual odometer are used.

WIPO Patent application No. 2018051337 (Gabbay et al.) published on Mar. 22, 2018, discloses a portable navigation systems, devices, methods and software for provision of navigation indications to a user in a GPS-denied environment, the system including at least one portable device, including a navigation Application (App) adapted to provide the user with navigational instructions and at least one interface component to provide at least one direction-specific instruction of movement to the user, wherein the App comprises an embedded algorithm adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least one vibrational components, responsive to a position of the device.

WIPO Patent application No. 2018002775 (CALVEZ el al.) published on Jan. 4, 2018, discloses a device for supplying electrical power to a wired system for a drone (1). The device according to the invention includes at least one power converter (4) on the ground and one power converter (2) at the level of the drone (1), regulation at the level of the converter on the ground ensures that the output voltage of the power converter (4) on the ground increases when the output current of the power converter (4) on the ground increases. The method according to the invention is intended for all wired drones, the wire (3) of which is used to supply electrical power to the drone (1).

Korean Patent application No. 20180031622 (HOON) published on Mar. 28, 2018, discloses a drone system, composed of a power from the flying drone and the ground power supply ground. Drone flying and ground power supply device connected to the wire connected to the wire to power. Drone flying includes a first GPS sensor, altitude sensor, a power supply module, the first radio communication unit and a drone controller. The ground power supply device includes a GPS sensor of claim 2, motor, battery ground, the ground communication unit and the ground control unit for rotating the jeonseonril. One end of the wire is connected to the power module of the drone and the other end is connected to the ground battery supplying the power to the ground power supply to the drone. Wires extend from the pulley while winding or jeonseonril. Drone control unit controls the first wireless communication section to transmit the information of the high 1GPS sensor position information and the elevation of the sensor above the ground power supply. The ground controller controls the ground communication section so as to receive the transmitted location information and the altitude information. Ground control unit using the received location information and the height information to calculate the distance of the drone and the ground power supply. The ground controller controls the rotation of the motor to perform an action in the pool, or winding the wires accommodated in jeonseonril.

Korean Patent No. 200486515 (DOWELS) published on May 31, 2018, discloses a power supply device according to the present invention, the wired cable is connected to the aerial vehicle; and supporting the rotating body, the rotating body; the rotating body consisting of a motor for driving the body; wherein the cable connected to the aircraft during flight phenomena in a drooping to the lower portion; and the deflection sensing whether contact deflection detection unit driven by the motor, which receives a signal control unit for controlling the cable length; There is characterized in that comprises a. According to the present invention, the cable connected to the aerial vehicle, wherein the aerial vehicle is hanging flight deflection in accordance with the lower cable is twisted or trip the obstacle and the vehicle power is not smoothly supplied to the detection unit, including deflection to prevent can adjust the length of the cable.

U.S. Pat. No. 9,387,928 (Gentry et al.) published on Jul. 12, 2016, discloses Systems and methods for providing a series of multiuse UAV docking stations are disclosed. The docking stations can be networked with a central control and a plurality of UAVs. The docking stations can include a number of services to facilitate both UAV guidance and maintenance and community acceptance and benefits. The docking stations can include package handling facilities and can act as a final destination or as a delivery hub. The docking stations can extend the range of UAVs by providing recharging/refueling stations for the UAVs. The docking stations can also include navigational aid to guide the UAVs to the docking stations and to provide routing information from the central control. The docking stations can be incorporated into existing structures such as cell towers, light and power poles, and buildings. The docking stations can also comprise standalone structures to provide additional services to underserved areas.

British Patent application No. 2553604 (Haider) published on Mar. 14, 2018, discloses a drone 601 having stabilizing means to dampen pitch and roll when the drone is in flight, comprising at least one gyroscope 604. Preferably there are two stabilizing gyroscopes located substantially centrally within the frame. There are a number of lift rotors 602 on the drone body 603, providing vertical lift. The drone may also have sideways facing air displacement means, preferably in the form of a plurality of drift rotors 605, and may have adjustable flaps. Preferably the air displacement means comprise four rotors aligned such that two of the rotors are substantially parallel and substantially perpendicular to the other two rotors. The drone preferably has an inductive charging means configured to connect inductively with a remote charging station when the drone is proximate to the charging station, in order to charge a battery on the drone. Preferably the drone has one or more cameras mounted on the shell configured to record or stream video footage. There are independent claims for a drone with inductive charging means, for a drone and storage station with inductive charging means and weather protection means, and for a carrier case for a drone.

GENERAL DESCRIPTION

In accordance with a first aspect of the presently disclosed subject matter, there is provided a system comprising: one or more Unmanned Aerial Vehicles (UAVs); and a UAV carrier configured to carry the UAVs from an origin to a destination; wherein the UAV carrier comprises a first controller configured to release the UAVs from the UAV carrier; and wherein each of the UAVs comprises: one or more motors configured to generate, directly or indirectly, a lift, lifting the UAV; and a second controller, configured to: activate at least one of the motors upon fulfilment of one or more conditions, thereby generating the lift, wherein after the release of the respective UAV and before the activation of the at least one motor of the respective UAV the motors of the respective UAV are inactive.

In some cases, the Unmanned Aerial Vehicle (UAV) carrier is a UAV.

In some cases, each of the UAVs further comprises an accelerometer, and wherein at least one of the conditions is that readings of the accelerometer indicate that the UAV reaches a terminal velocity.

In some cases, the readings are continuous.

In some cases, at least one of the conditions is that a pre-determined time passed since the UAV was released from the UAV carrier.

In some cases, each of the UAVs further comprises an altimeter, and wherein at least one of the conditions is that the readings of the altimeter indicate that the UAV reaches a given altitude.

In some cases, each of the UAVs has an armed state and a disarmed state, and wherein at least one of the conditions is that the respective UAV is in the armed state.

In some cases, each of the UAVs further comprises a velocity sensor, and wherein at least one of the conditions is that the readings of the velocity sensor indicate that the UAV reaches a given velocity.

In some cases, each of the UAVs further comprises a distance sensor, capable of measuring a distance between the UAV and the UAV carrier, and wherein at least one of the conditions is that the readings of the distance sensor indicate that the UAV reaches a given distance from the UAV carrier.

In some cases, each of the UAVs further comprises a folding mechanism, capable of folding and unfolding the UAV, such that a folded UAV takes up less volume than an unfolded UAV, and wherein at least one of the conditions is that the folding mechanism indicate that the UAV is unfolded.

In some cases, each of the UAVs further comprises a mechanical safety catch, connected to a first end of a cable connected to the UAV carrier at a second end of the cable, so that the release of the respective UAV causes the cable to stretch and release the mechanical safety catch and wherein at least one of the conditions is that the mechanical safety catch is released.

In some cases, the UAVs are connected to the UAV carrier via one or more interface connections controlled by the first controller.

In some cases, the UAVs are released by the first controller decoupling the interface connection.

In some cases, upon the interface connection being coupled the second controller prevents activation of the motors.

In some cases, the motors control respective rotors.

In some cases, each of the UAVs further comprises a gyroscope, and wherein the second controller is configured to control the motors using gyroscope readings of the gyroscope, thereby enabling controlling at least one of a pitch angle, a roll angle or a yaw angle of the UAV.

In accordance with a second aspect of the presently disclosed subject matter, there is provided a method comprising: carrying, by a UAV carrier, one or more Unmanned Aerial Vehicles (UAVs) from an origin to a destination;

releasing, by a first controller of the UAV carrier, the UAVs from the UAV carrier; and for each UAV of the UAVs: generating, by one or more motors of the UAV, directly or indirectly, a lift, lifting the UAV; and activating, by a second controller of the UAV, at least one of the motors, upon fulfilment of one or more conditions, thereby generating the lift, wherein after the release of the respective UAV and before the activation of the at least one motor of the respective UAV the motors of the respective UAV are inactive.

In some cases, the Unmanned Aerial Vehicle (UAV) carrier is a UAV.

In some cases, each of the UAVs further comprises an accelerometer, and wherein at least one of the conditions is that readings of the accelerometer indicate that the UAV reaches a terminal velocity.

In some cases, the readings are continuous.

In some cases, at least one of the conditions is that a pre-determined time passed since the UAV was released from the UAV carrier.

In some cases, each of the UAVs further comprises an altimeter, and wherein at least one of the conditions is that the readings of the altimeter indicate that the UAV reaches a given altitude.

In some cases, each of the UAVs has an armed state and a disarmed state, and wherein at least one of the conditions is that the respective UAV is in the armed state.

In some cases, each of the UAVs further comprises a velocity sensor, and wherein at least one of the conditions is that the readings of the velocity sensor indicate that the UAV reaches a given velocity.

In some cases, each of the UAVs further comprises a distance sensor, capable of measuring a distance between the UAV and the UAV carrier, and wherein at least one of the conditions is that the readings of the distance sensor indicate that the UAV reaches a given distance from the UAV carrier.

In some cases, each of the UAVs further comprises a folding mechanism, capable of folding and unfolding the UAV, such that a folded UAV takes up less volume than an unfolded UAV, and wherein at least one of the conditions is that the folding mechanism indicate that the UAV is unfolded.

In some cases, each of the UAVs further comprises a mechanical safety catch, connected to a first end of a cable connected to the UAV carrier at a second end of the cable, so that the release of the respective UAV causes the cable to stretch and release the mechanical safety catch and wherein at least one of the conditions is that the mechanical safety catch is released.

In some cases, the UAVs are connected to the UAV carrier via one or more interface connections controlled by the first controller.

In some cases, the UAVs are released by the first controller decoupling the interface connection.

In some cases, upon the interface connection being coupled the second controller prevents activation of the motors.

In some cases, the motors control respective rotors.

In some cases, each of the UAVs further comprises a gyroscope, and wherein the second controller is configured to control the motors using gyroscope readings of the gyroscope, thereby enabling controlling at least one of a pitch angle, a roll angle or a yaw angle of the UAV.

In accordance with a third aspect of the presently disclosed subject matter, there is provided anon-transitory computer readable storage medium having computer readable program code embodied therewith, the computer readable program code, executable by at least one processor of a computer to perform a method of: carrying, by a UAV carrier, one or more Unmanned Aerial Vehicles (UAVs) from an origin to a destination; releasing, by a first controller of the UAV carrier, the UAVs from the UAV carrier; and for each UAV of the UAVs: generating, by one or more motors of the UAV, directly or indirectly, a lift, lifting the UAV; and activating, by a second controller of the UAV, at least one of the motors, upon fulfilment of one or more conditions, thereby generating the lift, wherein after the release of the respective UAV and before the activation of the at least one motor of the respective UAV the motors of the respective UAV are inactive.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "activating", "controlling", "operating", "analyzing", "preforming", "releasing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
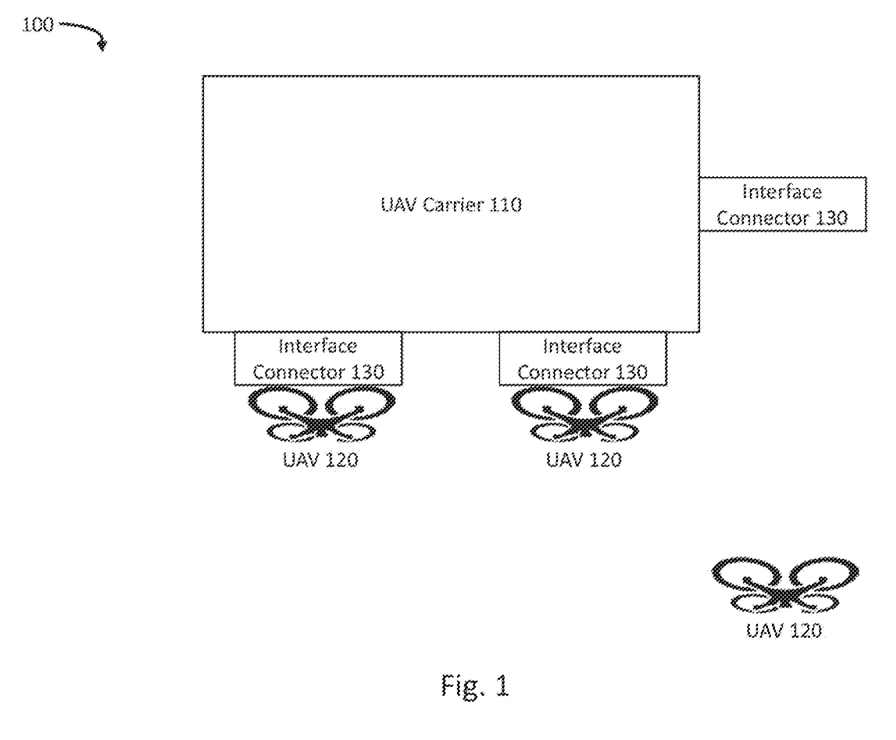
FIG. 1 is a schematic illustration of a release identification mechanism of UAVs being released from a UAV carrier, in accordance with the presently disclosed subject matter.
Figure 2:
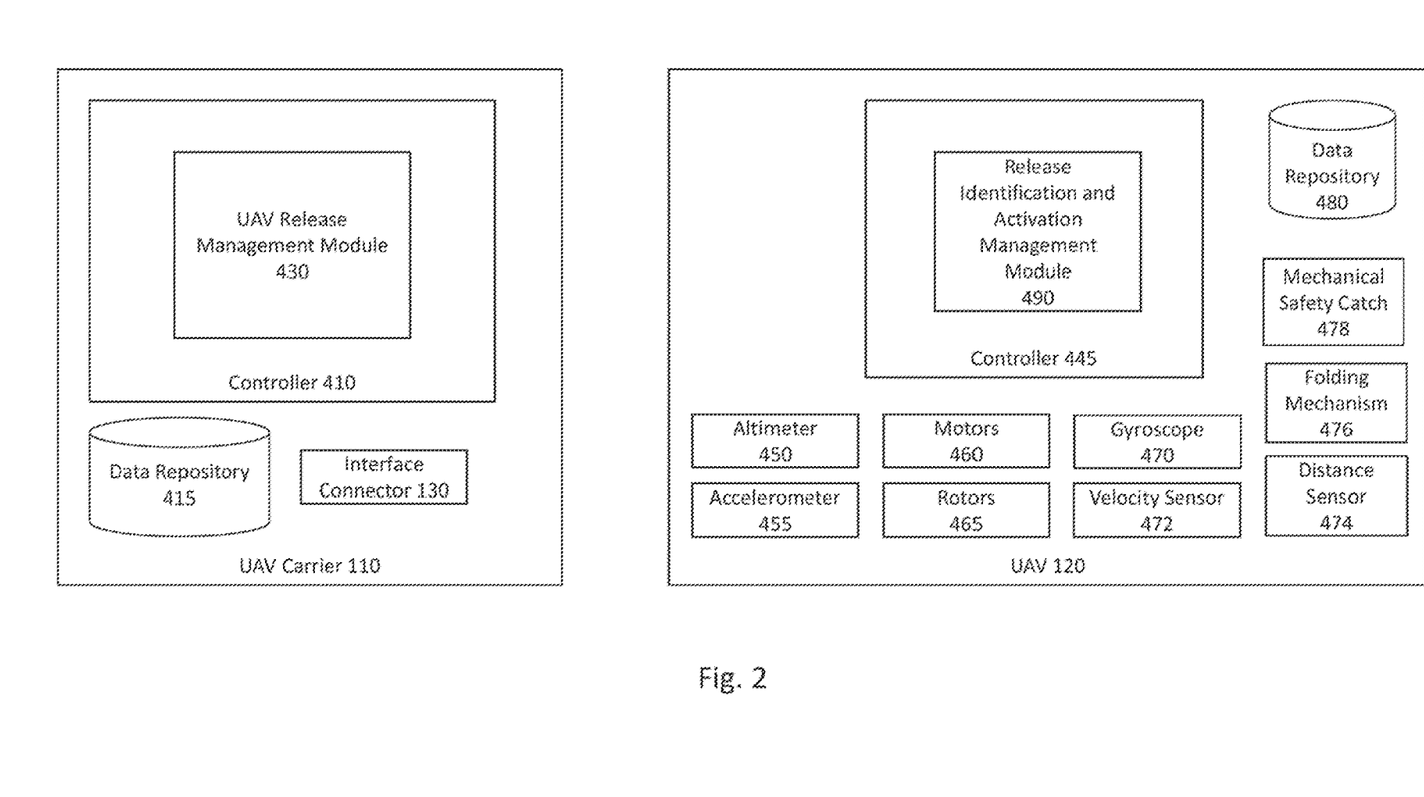
FIG. 2 is a block diagram schematically illustrating one example of a system for a UAV carrier, in accordance with the presently disclosed subject matter.
Figure 3:
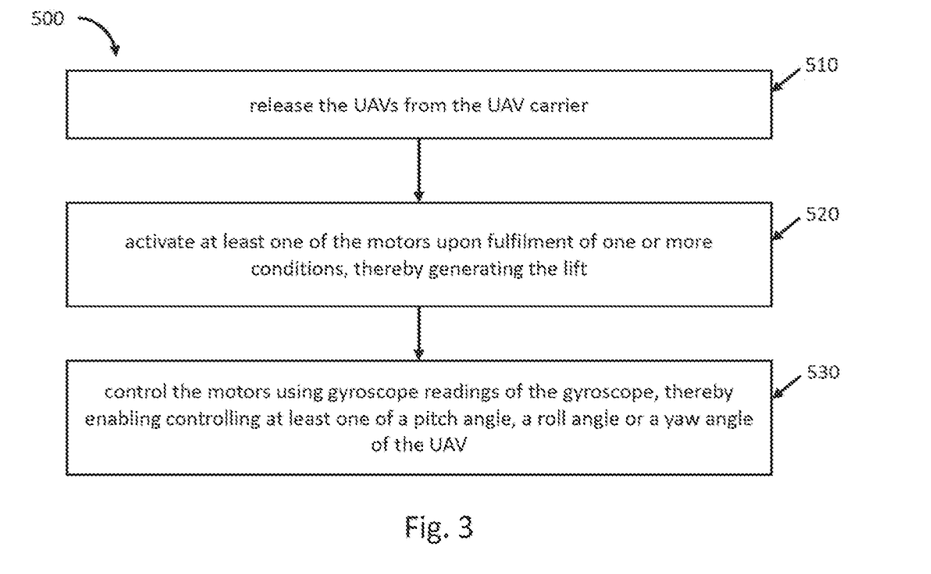
FIG. 3 is a flowchart illustrating one example of a sequence of operations carried out for release identification, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of a release identification mechanism of UAVs being released from a UAV carrier, in accordance with the presently disclosed subject matter.

According to the presently disclosed subject matter, environment 100, includes a UAV carrier 110, carrying one or more UAVs 120. UAVs 120 may be fixed-wing air vehicles, vertical take-off and landing air vehicles, helicopters, quadcopters, drones or any other type of unmanned air vehicle. UAVs 120 are commonly used nowadays to take part or to accomplish various missions or tasks that in the past required manned aircrafts. A non-limiting example for such a mission may be a disaster relief mission, wherein an area is hit by a disaster (e.g. an earthquake, a fire, a flood, etc.) and the UAVs 120 are utilized to bring information or to perform other tasks in the disaster hit area, without risking human operators. The UAVs 120 may be used in this example to fly to specific objectives or targets within the disaster area and capture live video footage of these targets. The video footage may be relayed to a disaster response headquarters and used to decide if and what kind of human assistance is required at each objective.

The UAVs 120 may be fully autonomous in fulfilling their missions, they may be remotely piloted UAVs 120, controlled by human controllers from afar or UAVs 120 may have partial autonomous capabilities, requiring human intervention in some aspects of their mission. In our example, the navigation of the UAVs 120 to their targets might be made autonomously, based on image analysis performed by the UAV 120 or the navigation to the target might be made by a human controller, controlling UAV 120 from a distant location.

Due to limitations in the amount of energy and in mission flight time of many UAVs 120, a UAV carrier 110 can be utilized to carry one or more UAVs 120 to a geographical vicinity of the mission area, thereby eliminating the need for the UAVs 120 to fly to the mission area by consuming their own limited powers. This can allow for a fast and secure transport of the UAVs 120 to the mission area, while preserving the UAVs 120 energy for the mission itself. Continuing our example, UAVs 120 may be stored in a central location when not in use. When a disaster hits a certain area, the UAVs 120 may be loaded on the UAV carrier 110 and transported by the UAV carrier 110 to the vicinity of the disaster area. Once in the vicinity of the disaster area the UAVs 120 can be released from the UAV carrier 110 and navigate, using their own motors, to the mission area to perform their tasks.

UAV carrier 110 might be any vehicle that can carry and transport one or more UAVs 120. UAV carrier 110 might be a wheeled vehicle (e.g. a car, a truck, etc.), a tracked vehicle (e.g. a tractor, an armored tracked vehicle, a tank, etc.), a watercraft (e.g. a boat, a hovercraft, a submarine, etc.) or an aerial vehicle (e.g. a plane, a helicopter, a balloon, etc.) or any other type of vehicle. UAV carrier 110 can be an unmanned vehicle, such as a UAV. In addition. UAV carrier 110 can be fully autonomous in transporting the UAVs 120 to the area of their mission and back. UAV carrier 110 can be remotely piloted, controlled by a human controller from afar or UAV carrier 110 can have partial autonomous capabilities, requiring human intervention in some aspects of its mission. In our example, UAV carrier 110 may be a UAV, transporting the UAVs 120 to the disaster hit area by flying there. Releasing the UAVs 120 in the vicinity of the disaster hit area. Hovering above the disaster hit area, waiting for the UAVs 120 to complete their missions. The UAVs 120 can return to the UAV carrier 110 upon completing their missions. In some cases, the UAVs 120 can re-connect to the UAV carrier 110 and the UAV carrier 110 can transport them back to a central storage location or to the vicinity of a next mission area where the UAVs 120 will perform another mission.

UAV carrier 110 may carry one or more UAVs 120 in various ways. The UAVs 120 can be stored internally inside the UAV carrier 110 while en route to or from the mission area. The UAV carrier 110 might have an opening for the UAVs 120 to enter or leave the internal storage area. In this case the UAVs 120 may depart from UAV carrier 110 and/or return to the UAV carrier 110 by using their own power and flight capabilities. In other cases, the UAVs 120 can be released and dropped out of the UAV carrier 110 by the UAV carrier 110 opening a bay door of the storage area. In some cases. UAV carrier 110 can carry the UAVs 120 by utilizing one or more interface connectors 130. Each interface connector 130 can be a mechanical connector or a magnetic connector or an electrical connector or any other type of connector connecting, one or more UAVs 120, securely to UAV carrier 110. One or more interface connectors 130 are connected to the UAV carrier 110 and to one or more UAVs 120, in such a manner that the UAVs 120 are secured to the UAV carrier 110 while transported. Each interface connector 130 may be connected to one or more UAVs 120. Each UAV 120 might be attached to one or more interface connectors 130. The interface connectors 130 might be installed in an internal storage area, inside the UAV carrier 110, or on the outer part of the UAV carrier's 110 body. The interface connectors 130 are controlled by the UAV carrier 110, in such a manner that the interface connector 130 can release the UAVs 120 from the UAV carrier 110 and optionally re-connect the UAVs 120 to the UAV carrier 110. A given UAV 120 may be released from the UAV carrier 110 by decoupling the respective interface connectors 130, holding the given UAV 120 to the UAV carrier 110.

Irrespective of the way the UAVs 120 have been released from UAV carrier 110, there is a need for the UAVs 120 to recognize that they have been released and upon recognizing their release, to activate their motors (noting that prior to the motors activation the motors are naturally inactive, and the UAVs 120 are free-falling) and start fulfilling their missions. In accordance with the presently disclosed subject matter, described herein is a mechanism for UAVs 120 to recognize their release from the UAV carrier 110 and to subsequently activate their motors (noting that prior to the motors activation the motors are naturally inactive, and the UAVs 120 are free-falling) in order to navigate to a target within the mission area and to realize their tasks.

UAV carrier 110 can release one or more UAVs 120. In some cases, UAV carrier 110 includes one or more canisters. The canisters are installed in the internal part of UAV carrier 110. Each canister can store one or more UAVs 120 in different storage positions (e.g. vertical position, horizontal position, or any other possible storage position). UAVs 120 can be released from the canisters and out of UAV carrier 110, in various release angles. Each UAV 120 can be released from UAV carrier 110 in any release angle. The release angle can differ between UAVs 120. In some cases, the release angle is such that UAV 120 is released while facing the ground. In other cases, UAV 120 is release while facing upwards. In other cases, the release angle is arbitrary.

The UAVs 120 monitor the fulfillment of one or more conditions. Upon the fulfillment of one or more conditions, the respective UAVs 120 activate their motors (noting that prior to the motors activation the motors are naturally inactive, and the UAVs 120 are free-falling) thereby generating lift and can navigate to their target in order to perform their missions.

The one or more conditions whose fulfillment is monitored by the UAV 120 can include UAV 120 reaching a pre-determined acceleration, for example: reaching terminal velocity. The fulfillment of the condition is determined by observing readings of an accelerometer, that is comprised within the UAV 120, indicating that the UAV 120 has reached terminal velocity. In this case, UAV 120 can be released from the UAV carrier 110, which is an aircraft flying in the air. After it is released, UAV 120 starts to fall to the ground through the air. After a while, the readings of the accelerometer of the UAV 120, indicate that UAV 120 has reached terminal velocity, by indicating that the acceleration of UAV 120 is of 1 g acceleration upwards. Upon reaching terminal velocity the UAV 120 identifies its release from the UAV carrier, activates its motors (noting that prior to the motors activation the motors are naturally inactive, and the UAV 120 is free-falling) and starts its mission. It is to be noted, that in some cases the UAVs 120 can recognize their release from the UAV carrier 110 by relying on their own means only, with no information transmitted to them from the UAV carrier 110. It is to be further noted that the observation of the fulfillment of the one or more conditions may be done by the UAVs 120 continually. In some cases, the conditions may include that the UAV 120 has maintained the terminal velocity for at least a first threshold of time.

The conditions for UAV 120 to identify its release from UAV carrier 110 can further include that a pre-determined time passed since the UAV 120 was released from the UAV carrier 110, that the UAV 120 has reached a given altitude, that the UAV 120 is in an armed state, that the UAV 120 has reached a given velocity, that the UAV 120 has reached a given distance from the UAV carrier 110, that the UAV 120 is in an unfolded state or that a mechanical safety catch is released.

It is to be noted that the condition may be a combination of a number of the above detailed conditions or of other conditions observable by UAV 120, as further detailed herein, inter alia with respect to FIG. 3.

In a non-limiting illustrated example in FIG. 1, which continues our previous examples, the UAV carrier 110 is a UAV hovering high above the ground in the vicinity of disaster hit area. A given UAV 120 is decoupled from interface connector 130, which has been fasting UAV 120 to the UAV carrier 110 during transport. The given UAV 120 starts to fall towards the ground through the air. The given UAV 120 observes that one of the conditions of identifying release its release from the UAV carrier 110 has been fulfilled, for example that readings of an accelerometer of the given UAV 120 indicate that terminal velocity has been reached and maintained for a number of seconds. The given UAV 120 than activates its motors (noting that prior to the motors activation the motors are naturally inactive, and the UAV 120 is free-falling) and navigates to the mission area to perform its tasks.

It is noted, that in some cases, the given UAV 120 will not activate its motors, even when one or more of the conditions are met, if a state of the given UAV 120 is not an armed state, thus preventing accidental activation of UAV 120 while in an unarmed state.

It is noted, that in some cases, the given UAV 120 will not activate its motors, even when one or more of the conditions are met, if the one or more respective interface connectors 130, coupling the given UAV 120 to the UAV carrier 110, have not been released, thus preventing accidental activation of UAV 120 while still coupled to UAV carrier 110.

Attention is drawn to FIG. 2, a block diagram schematically illustrating one example of a UAV carrier, in accordance with the presently disclosed subject matter.

According to certain examples of the presently disclosed subject matter, UAV carrier 110 can comprise an interface connector 130, capable of coupling one or more UAVs 120 for fastening the UAVs 120 to the UAV carrier during transport. UAV carrier 110 may be any vehicle that can carry and transport one or more UAVs 120. UAV carrier 110 might be a wheeled vehicle (e.g. a car, a truck, etc.), a tracked vehicle (e.g. a tractor, an armored tracked vehicle, a tank, etc.), a watercraft (e.g. a boat, a hovercraft, a submarine, etc.) or an aerial vehicle (e.g. a plane, a helicopter, a balloon, etc.) or any other type of vehicle. The UAV carrier 110 might be an unmanned vehicle, such as a UAV.

UAV carrier 110 can further comprise, or be otherwise associated with, a data repository 415 (e.g. a database, a storage system, a memory including Read Only Memory—ROM, Random Access Memory—RAM, or any other type of memory, etc.) configured to store data, including inter alia navigational data, interface connectors 130 status information, etc. Data repository 415 can be further configured to enable retrieval and/or update and/or deletion of the stored data. It is to be noted that in some cases, data repository 415 can be distributed, while the UAV carrier 110 has access to the information stored thereon, e.g. via a wireless network to which UAV carrier 110 is able to connect to.

UAV carrier 110 further comprises a controller 410. Controller 410 can be one or more processing units (e.g. central processing units), microprocessors, microcontrollers or any other computing devices or modules, including multiple and/or parallel and/or distributed processing units, which are adapted to independently or cooperatively process data for controlling relevant resources of the UAV carrier 110 and for enabling operations related to resources of the UAV carrier 110.

The controller 410 can comprise the following module UAV release management module 430.

According to some examples of the presently disclosed subject matter, UAV release management module 430 can be configured to perform a release identification and activation process, as further detailed herein, inter alia with respect to FIG. 3.

According to certain examples of the presently disclosed subject matter, UAV 120 can comprise motors 460, capable of generating a lift for UAV 120. UAV 120 may additionally comprise of rotors 465, controlled by said motors 460 to rotate and provide said lift. In other cases, motors 460 are jet motors and can directly create lift for UAV 120. UAV 120 may be a fixed-wing air vehicle, a vertical take-off and landing air vehicle, a helicopter, a quadcopter, a drone or any other type of unmanned air vehicle. UAV 120 may be fully autonomous in fulfilling its missions, it may be remotely piloted, or it may have partial autonomous capabilities, requiring human intervention in some aspects of its mission.

UAV 120 can further comprise an altimeter 450, capable of measuring a height of the UAV 120.

UAV 120 can further comprise an accelerometer 455, capable of measuring an acceleration of the UAV 120.

UAV 120 can further comprise a gyroscope 470, capable of measuring orientation and angular velocity of the UAV 120, thereby enabling controller 445 to control at least one of a pitch angle, a roll angle or a yaw angle of the UAV 120.

UAV 120 can further comprise a velocity sensor 472, capable of measuring the velocity of the UAV 120. In some cases, velocity sensor 472 measures the velocity of UAV 120 by utilizing readings of accelerometer 455. In some cases, velocity sensor 472 measures the velocity of UAV 120 by utilizing readings of a barometer that is comprised within UAV 120. In these cases, the changes in the readings of the barometer for a given period of time are used to measure the velocity of UAV 120. It is to be noted that velocity sensor 472 can measure the velocity of the UAV 120 even when the engines are inactive.

UAV 120 can further comprise a distance sensor 474, capable of measuring the distance between UAV 120 and an object. In some cases, the object is UAV carrier 110 and the distance sensor 474 is used to measure the distance between UAV 120 and UAV carrier 110. In some cases, distance sensor 474 measures the distance of UAV 120 from the object by analyzing images taken by an image sensor that is comprised within UAV 120. In some cases, distance sensor 474 can utilize radio waves to measure the distance of UAV 120 from the object. In some cases, distance sensor 474 can utilize ultrasonic waves to measure the distance of UAV 120 from the object. In some cases, the distance sensor 474 is a mechanical sensor utilizing a cable connected on one end to the UAV carrier 110 and on the other end to UAV 120. In this case, the cable is coiled within a casing when UAV 120 is fastened to the UAV carrier 110. Upon the release of UAV 120 from the UAV carrier 110, at least part of the cable is pulled out of the casing thereby allowing UAV 120 to measure the length of the part of the cable thereby determining the distance from UAV carrier 110.

UAV 120 can further comprise a folding mechanism 476, capable of folding and unfolding the UAV 120, such that a folded UAV 120 takes up less volume than an unfolded UAV 120. An unlimiting example can be that when folded, UAV's 120 arms, each holding one of the motors 460, are adjacent to a body of the UAV 120 and when unfolded, UAV's 120 arms are in a given distance from the body of the UAV 120. It is noted that UAV carrier 110 utilizes less volume when carrying one or more UAVs 120 in a folded state.

UAV 120 can further comprise a mechanical safety catch 478. The mechanical safety catch 478 is in an un-released state before the release of UAV 120 from UAV carrier 110. The mechanical safety catch 478 is connected to a first end of a cable. The second end of the cable is connected to the UAV carrier 110 in a way that the release of the respective UAV causes the cable to stretch and release the mechanical safety catch 478.

UAV 120 can further comprise, or be otherwise associated with, a data repository 480 (e.g. a database, a storage system, a memory including Read Only Memory—ROM, Random Access Memory—RAM, or any other type of memory, etc.) configured to store data, including inter alia pre-determined timer values, altitude thresholds, other release identification related data, etc. Data repository 480 can be further configured to enable retrieval and/or update and/or deletion of the stored data. It is to be noted that in some cases, data repository 480 can be distributed, w % bile the UAV 120 has access to the information stored thereon, e.g. via a wireless network to which UAV 120 is able to connect to.

UAV 120 further comprises a controller 445. Controller 445 can be one or more processing units (e.g. central processing units), microprocessors, microcontrollers or any other computing devices or modules, including multiple and/or parallel and/or distributed processing units, which are adapted to independently or cooperatively process data for controlling relevant resources of the UAV 120 and for enabling operations related to resources of the UAV 120.

The controller 445 can comprise the following module release identification and activation management module 490.

According to some examples of the presently disclosed subject matter, release identification and activation management module 490 can be configured to perform a release identification and activation process, as further detailed herein, inter alia with respect to FIG. 3.

FIG. 3 is a flowchart illustrating one example of a sequence of operations carried out for release identification, in accordance with the presently disclosed subject matter.

According to certain examples of the presently disclosed subject matter, UAV carrier 110 and UAV 120 can be configured to perform a release identification and activation process 500, e.g. by UAV carrier 110 utilizing the data service module 430 and by UAV 120 utilizing the release identification and activation management module 490.

As detailed above, due to limitations in the amount of energy and in mission flight time of many UAVs 120, a UAV carrier 110 can carry one or more UAVs 120 to a geographical vicinity of a mission area, thereby eliminating the need for the UAVs 120 to fly to the mission area by consuming their own limited powers. The UAVs 120 can be stored internally inside the UAV carrier 110 while en route to or from the mission area. In additional cases, UAV carrier 110 can carry the UAVs 120 utilizing one or more interface connectors 130. One or more interface connectors 130 are connected to the UAV carrier 110 and to one or more UAVs 120, such that the UAVs 120 are secured to the UAV carrier 110 while transported. Each interface connector 130 may be connected to one or more UAVs 120. Each UAV 120 might be attached to one or more interface connectors 130. The interface connectors 130 might be installed in an internal storage area inside the UAV carrier 110 or on the outer part of the UAV carrier's 110 body.

The UAV carrier 110 can be an aerial vehicle, transporting the UAVs 120 to the vicinity of the mission area and optionally flying or hovering above the mission area, allowing the UAVs 120 to start their mission by releasing them in mid-air above the mission area.

For this purpose, UAV carrier 110 can be configured to release the UAVs 120 from the UAV carrier 110 (block 510).

The release of the UAVs 120 can be achieved by the UAV carrier 110 opening a bay door of the storage area, thus dropping the UAVs 120 out of the internal storage area.

In other cases, the UAV carrier 110 may carry the UAVs 120 by utilizing one or more interface connectors 130. In this embodiment, the release of a given UAV 120 from the UAV carrier 110 is achieved by decoupling the respective interface connectors 130, holding the given UAV 120. The given UAV 120 then starts falling down from the UAV carrier 110 through the air.

Irrespective of the way the UAVs 120 have been released from UAV carrier 110, there is a need for the UAVs 120 to recognize that they have been released and upon recognizing their release, to activate their motors (noting that prior to the motors activation the motors are naturally inactive, and the UAVs 120 are free-falling) and start fulfilling their missions.

For this purpose, UAV 120 can be configured to activate at least one of the motors 460 upon fulfilment of one or more conditions, thereby generating the lift (noting that prior to the motors activation the motors are naturally inactive, and the UAV 120 is free-falling) (block 520).

Upon the UAV carrier 110 releasing one or more UAVs 120, The released UAVs 120 monitor the fulfillment of one or more conditions by monitoring various parameters, as further detailed below. Upon the fulfillment of one or more conditions, the respective UAVs 120 activate their motors (noting that prior to the motors activation the motors are naturally inactive, and the UAVs 120 are free-falling) thereby generating lift and may navigate to their target in order to perform their missions.

The one or more conditions whose fulfillment is monitored by the UAV 120 can include UAV 120 reaching a pre-determined acceleration, for example: reaching terminal velocity. The fulfillment of the condition is determined by monitoring, by the release identification and activation management module 490 of controller 445, readings of accelerometer 455, indicating that the UAV 120 has reached a terminal velocity. In this case, the UAV 120 may have been released from the UAV carrier 110 which is an aerial vehicle flying or hovering in the air. The UAV 120 then starts to free-fall to the ground through the air. After a while the accelerometer 455 indicates that the UAV 120 has reached terminal velocity by indicating that the acceleration of the UAV 120 is of 1 g acceleration upwards. Upon reaching terminal velocity the condition has been met and UAV 120 identifies its release from the UAV carrier, activates its motors (noting that prior to the motors activation the motors are naturally inactive, and the UAVs 120 are free-falling) and starts its mission. It is to be noted, that in this case the UAV 120 recognizes its release from the UAV carrier 110 by relying on its own means only (i.e. the readings from accelerometer 455), without relying on any kind of external information, such as information transmitted from the UAV carrier 110. It is to be further noted that the observation of the fulfillment of the one or more condition may be done by the UAVs 120 continually, by continuously observing the readings of accelerometer 455. In some cases, the condition may include that the UAV 120 has maintained the terminal velocity for at least a first threshold of time.

In some cases, the one or more conditions for UAV 120 to identify its release from UAV carrier 110 can include a pre-determined time passed since the UAV 120 was released. The fulfillment of the condition can be determined by monitoring, by the release identification and activation management module 490 of controller 445, readings of a timer, indicating that a pre-determined time passed since the UAV 120 was released from the UAV carrier 110 or that a pre-determined time passed since UAV 120 passed a certain geolocation or that a pre-determined time passed since UAV carrier 110 took off or that a pre-determined time passed since a "start timer" command was given to a given UAV 120 by an operator of the given UAV 120. In one non-limiting example, as the UAV 120 is released from the UAV carrier 110 which is an aerial vehicle flying or hovering in the air and the UAV 120 starts to free-fall to the ground, the timer starts to measure time. After a while the timer indicates that the time passed from the release of UAV 120 has reached a pre-determined time. Upon reaching the pre-determined time, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the readings from accelerometer 455), without requiring any kind of external information, such as information transmitted from the UAV carrier 110. It is to be further noted that the observation of the fulfillment of the one or more condition may be done by the UAVs 120 continually, by continuously observing the readings of the timer.

FIG. 1 shows a non-limiting example wherein the UAV carrier 110 is a UAV hovering high above the ground in the vicinity of disaster hit area. A given UAV 120 is decoupled from interface connector 130, which has been fasting UAV 120 to the UAV carrier during the transport. The given UAV 120 starts to free-fall towards the ground through the air and a timer of the given UAV 120 starts to measure time. The given UAV 120 monitors the timer, and when a pre-defined time has passed, the condition is fulfilled, and the given UAV 120 activates its motors (noting that prior to the motors activation the motors are naturally inactive, and the UAV 120 is free-falling) and navigates to the mission area to perform its tasks.

The one or more conditions whose fulfillment is monitored by the UAV 120 can include UAV 120 reaching a pre-determined altitude. The fulfillment of this condition can be determined by monitoring, by the release identification and activation management module 490 of controller 445, readings of an altimeter 450, indicating that the UAV 120 has reached a given altitude. In this case, the UAV 120 may have been released from the UAV carrier 110 which is an aerial vehicle flying or hovering in the air. The UAV 120 then starts to free-fall to the ground through the air. UAV 120 monitors the altimeter 450. Upon reaching the given altitude, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the readings from altimeter 450), without requiring any kind of external information, such as information transmitted from the UAV carrier 110. It is to be further noted that the observation of the fulfillment of the one or more condition may be done by the UAVs 120 continually, by continuously observing the readings of altimeter 450.

An example, as depicted in FIG. 1, may be that the UAV carrier 110 is a UAV hovering high above the ground in the vicinity of disaster hit area in an altitude of 3,000 meters. A given UAV 120 is decoupled from interface connector 130, which has been fasting UAV 120 to the UAV carrier 110 during the transport. The given UAV 120 starts to free-fall towards the ground through the air. The given UAV 120 monitors the readings of the altimeter 450. When the altimeter 450 indicates that the given UAV 120 has reached a predetermined altitude, an example predetermined altitude may be 2,000 meters, the UAV 120 activates its motors (noting that prior to the motors activation the motors are naturally inactive, and the UAV 120 is free-falling) and navigates to the mission area to perform its tasks.

The one or more conditions observed by the UAV can include UAV 120 being in an armed state. The fulfillment of this condition can be determined by monitoring, by the release identification and activation management module 490 of controller 445, readings of the state of UAV 120, indicating that the UAV 120 is in an armed state. UAV 120 may have a number of states: an armed state and other states. The states may be changed by controller 445 in response to an operator command or in response to a certain internal logic of UAV 120. It is to be noted, that is some cases, UAV 120 being in an armed state is a prerequisite to enable activation of motors 460. In this case, UAV 120 may have been released from the UAV carrier 110 which is an aerial vehicle flying or hovering in the air. The UAV 120 then starts to free-fall to the ground through the air. UAV 120 reads the state of the UAV 120. If the state of the UAV 120 is armed, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the reading of UAV 120 state), without requiring any kind of external information, such as information transmitted from the UAV carrier 110. It is to be further noted that the observation of the fulfillment of the one or more condition may be done by the UAVs 120 continually, by continuously observing the state of the UAV 120.

In the non-limiting example illustrated in FIG. 1, a given UAV 120 is given an armed state by an operator of the UAV 120 before being loaded into the UAV carrier 110 by coupling it to a interface connector 130. The UAV carrier 110 is an aerial vehicle flying high above the ground in the vicinity of disaster hit area. A given UAV 120 is decoupled from interface connector 130, which has been fasting UAV 120 to the UAV carrier 110 during the transport. The given UAV 120 starts to free-fall towards the ground through the air. The given UAV 120 monitors its own state. Upon reading an armed state, the UAV 120 activates its motors (noting that prior to the motors activation the motors are naturally inactive, and the given UAV 120 is free-falling) and navigates to the mission area to perform its tasks.

The one or more conditions whose fulfillment is monitored by the UAV 120 can include UAV 120 reaching a pre-determined velocity. The fulfillment of this condition can be determined by monitoring, by the release identification and activation management module 490 of controller 445, readings of a velocity sensor 472, indicating that the UAV 120 has reached a given velocity. In this case, the UAV 120 may have been released from the UAV carrier 110 which is an aerial vehicle flying or hovering in the air. The UAV 120 then starts to free-fall to the ground through the air. UAV 120 monitors the velocity sensor 472. Upon reaching the given velocity, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the readings from velocity sensor 472), without requiring any kind of external information, such as information transmitted from the UAV carrier 110. It is to be further noted that the observation of the fulfillment of the one or more condition may be done by the UAVs 120 continually, by continuously observing the readings of velocity sensor 472.

An example, as depicted in FIG. 1, may be that the UAV carrier 110 is a UAV hovering high above the ground in the vicinity of disaster hit area in a certain altitude. A given UAV 120 is decoupled from interface connector 130, which has been fasting UAV 120 to the UAV carrier 110 during the transport. The given UAV 120 starts to free-fall towards the ground through the air. The given UAV 120 monitors the readings of the velocity sensor 472. When the velocity sensor 472 indicates that the given UAV 120 has reached a predetermined velocity, an example predetermined velocity may be between 1-10 meters per second, the UAV 120 activates its motors (noting that prior to the motors activation the motors are naturally inactive, and the UAV 120 is free-falling) and navigates to the mission area to perform its tasks.

The one or more conditions whose fulfillment is monitored by the UAV 120 can include UAV 120 reaching a pre-determined distance from UAV carrier 110. The fulfillment of this condition can be determined by monitoring, by the release identification and activation management module 490 of controller 445, readings of a distance sensor 474, indicating that the UAV 120 has reached a given distance from UAV carrier 110. In this case, the UAV 120 may have been released from the UAV carrier 110 which is an aerial vehicle flying or hovering in the air. The UAV 120 then starts to free-fall to the ground through the air. UAV 120 monitors the distance sensor 474. Upon reaching the given distance from UAV carrier 110, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the readings from distance sensor 474), without requiring any kind of external information, such as information transmitted from the UAV carrier 110. It is to be further noted that the observation of the fulfillment of the one or more condition may be done by the UAVs 120 continually, by continuously observing the readings of distance sensor 474.

An example, as depicted in FIG. 1, may be that the UAV carrier 110 is a UAV hovering high above the ground in the vicinity of disaster hit area in a certain altitude. A given UAV 120 is decoupled from interface connector 130, which has been fasting UAV 120 to the UAV carrier 110 during the transport. The given UAV 120 starts to free-fall towards the ground through the air. The given UAV 120 monitors the readings of the distance sensor 474. When the distance sensor 474 indicates that the given UAV 120 has reached a predetermined distance from UAV carrier 110, an example predetermined distance may be a given distance between 1-50 meters between UAV 120 and UAV carrier 110, the UAV 120 activates its motors (noting that prior to the motors activation the motors are naturally inactive, and the UAV 120 is free-falling) and navigates to the mission area to perform its tasks.

The one or more conditions whose fulfillment is monitored by the UAV 120 can include that UAV 120 is unfolded. The fulfillment of this condition can be determined by monitoring, by the release identification and activation management module 490 of controller 445, reading a state of a folding mechanism 476, indicating that the UAV 120 has reached an unfolded state. In this case, UAV carrier 110 is an aerial vehicle flying or hovering in the air. UAV 120 is in a folded state when fastened to UAV carrier 110. Upon UAV 120 release from the UAV carrier, UAV 120 starts to free-fall to the ground through the air and the folding mechanism 476 is activated to unfold the UAV 120. UAV 120 monitors the folding mechanism 476. Upon reaching an unfolded state, the condition has been met and UAV 120 identifies its release from the UAV carrier, activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the readings from folding mechanism 476), without requiring any kind of external information, such as information transmitted from the UAV carrier 110. It is to be further noted that the observation of the fulfillment of the one or more condition may be done by the UAVs 120 continually, by continuously observing the readings of folding mechanism 476.

An example, as depicted in FIG. 1, may be that the UAV carrier 110 is a UAV hovering high above the ground in the vicinity of disaster hit area in a certain altitude. A given UAV 120 is decoupled from interface connector 130, which has been fasting UAV 120 to the UAV carrier 110 during the transport while in a folded state. The given UAV 120 starts to free-fall towards the ground through the air and starts to unfold. The given UAV 120 monitors the readings of the folding mechanism 476. When the folding mechanism 476 indicates that the given UAV 120 has reached an unfolded state, the UAV 120 activates its motors (noting that prior to the motors activation the motors are naturally inactive, and the UAV 120 is free-falling) and navigates to the mission area to perform its tasks.

The one or more conditions whose fulfillment is monitored by the UAV 120 can include that the mechanical safety catch 478 of UAV 120 is released. The fulfillment of this condition can occur after the release of UAV 120 from UAV carrier 110 by a cable, that is connected on one end to the mechanical safety catch 478 and on its other end to the UAV carrier 110, stretching and upon reaching its full length releasing the mechanical safety catch 478. In this case, UAV carrier 110 is an aerial vehicle flying or hovering in the air. The mechanical safety catch 478 of UAV 120 is in an un-released state when fastened to UAV carrier 110. Upon UAV 120 release from the UAV carrier. UAV 120 starts to free-fall to the ground through the air and the cable stretches until reaching its full length and then releasing the mechanical safety catch 478. Upon the release of the mechanical safety catch 478, the condition has been met and UAV 120 activates its motors (noting that prior to the motors activation the motors are naturally inactive, and the UAV 120 is free-falling) and starts its mission. It is to be noted, that in this case the UAV 120 recognizes its release from the UAV carrier 110 by relying on its own means only (i.e. the state of the mechanical safety catch 478), without requiring any kind of external information, such as information transmitted from the UAV carrier 110.

An example, as depicted in FIG. 1, may be that the UAV carrier 110 is a UAV hovering high above the ground in the vicinity of disaster hit area in a certain altitude. A given UAV 120 is decoupled from interface connector 130, which has been fasting UAV 120 to the UAV carrier 110 during the transport while the mechanical safety catch 478 of the given UAV 120 is in an un-released state. The given UAV 120 starts to free-fall towards the ground through the air and the cable connecting the mechanical safety catch 478 of the given UAV 120 stretches until reaching an example length of 3 meters and the releases the mechanical safety catch 478 of the given UAV 120. The given UAV 120 activates its motors (noting that prior to the motors activation the motors are naturally inactive, and the UAV 120 is free-falling) and navigates to the mission area to perform its tasks.

It is to be noted that the condition may be any combination of one or more of the above detailed conditions or of other conditions observable by UAV 120. For example, the condition may be a combination of meeting the predetermined altitude reading from altimeter 450 and that the UAV 120 is in an armed state. In such a case, reading of a predetermined altitude when the UAV 120 is not in an armed state, does not meet the combined condition.

Upon UAV 120 activating at least one of the motors 460, it may optionally require stabilization in order to be able to fly and start its mission, since the UAV 120 is not leveled in respect to the ground.

For this purpose, the UAV 120 may be further configured to control the motors 460 using gyroscope readings of the gyroscope 470, thereby enabling controlling at least one of a pitch angle, a roll angle or a yaw angle of the UAV 120 (block 530).

Continuing our previous examples, the UAV 120 is decoupled from interface connector 130, which has been fasting UAV 120 to the UAV carrier during the transport. The given UAV 120 starts to free-fall towards the ground through the air. The body of the given UAV 120 has rotated during the free-fall and the UAV 120 is not leveled in respect to the ground in one or more of the vertical, transverse and longitudinal axes. The given UAV 120 observes that one of the conditions of identifying release its release from the UAV carrier 110 was fulfilled. The given UAV 120 than activates its motors (noting that prior to the motors activation the motors are naturally inactive, and the given UAV 120 is free-falling) and utilizing the gyroscope 470 readings, stabilizes itself in one or more of the yaw, pitch and roll axes in order to level the UAV 120 in respect to the ground and to continue flying to the mission area.

In addition, in some cases, controller 445 of a given UAV 120 will prevent the activation of motors 460 of the given UAV 120, upon the given interface connectors 130, being the interface connectors 130 coupling the given UAV 120 to the UAV carrier 110, being coupled.

In a non-limiting example, the UAV 120 is still coupled to the interface connector 130, fastening it to the UAV carrier 1110. Controller 445 will prevent motors 460 of activating even if the conditions will be met. The altitude condition, for example, may be met as the UAV 120 reaches a certain altitude, but the motors 460 will not activate while UAV 120 is still connected to UAV carrier through the interface connectors 130.

It is to be noted that, with reference to FIG. 3, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a s program of instructions executable by the machine for executing the disclosed method.

The invention claimed is:

1. A system comprising:
    one or more Unmanned Aerial Vehicles (UAVs); and
    a UAV carrier configured to carry the UAVs from an origin to a destination;
    wherein the UAV carrier comprises a first controller configured to release the UAVs from the UAV carrier; and
    wherein each of the UAVs comprises:
        one or more motors configured to generate, directly or indirectly, a lift, lifting the UAV; and
        a second controller, configured to:
        activate at least one of the motors of the respective UAV after the release of the respective UAV from the UAV carrier and upon fulfilment of one or more conditions, thereby generating the lift, wherein the conditions include one or more of the following: (a) that each of the UAVs further comprises an accelerometer, and that readings of the accelerometer indicate that the respective UAV reaches a terminal velocity, (b) that each of the UAVs further comprises an altimeter, and that the readings of the altimeter indicate that the respective UAV reached a given altitude, (c) that each of the UAVs has an armed state and a disarmed state, and that the respective UAV is in the armed state, and (d) that each of the UAVs further comprises a distance sensor, capable of measuring a distance between the respective UAV and the UAV carrier, and that the readings of the distance sensor indicate that the respective UAV reached a given distance from the UAV carrier.

2. The system according to claim 1, wherein at least one of the conditions is that a pre-determined time passed since the UAV was released from the UAV carrier.

3. The system according to claim 1, wherein each of the UAVs further comprises a distance sensor, capable of measuring a distance between the UAV and the UAV carrier, and wherein at least one of the conditions is that the readings of the distance sensor indicate that the UAV reaches a given distance from the UAV carrier.

4. The system according to claim 1, wherein each of the UAVs further comprises a mechanical safety catch, connected to a first end of a cable connected to the UAV carrier at a second end of the cable, so that the release of the respective UAV causes the cable to stretch and release the mechanical safety catch and wherein at least one of the conditions is that the mechanical safety catch is released.

5. The system according to claim 1, wherein: (a) the UAVs are connected to the UAV carrier via one or more interface connections controlled by the first controller, (b) the UAVs are released by the first controller decoupling the interface connection, and (c) upon the interface connection being coupled the second controller prevents activation of the motors.

6. The system according to claim 1, wherein the motors control respective rotors and wherein each of the UAVs further comprises a gyroscope, and wherein the second controller is configured to control the motors using gyroscope readings of the gyroscope, thereby enabling controlling at least one of a pitch angle, a roll angle or a yaw angle of the UAV.

7. A method comprising: carrying, by a UAV carrier, one or more Unmanned Aerial Vehicles (UAVs) from an origin to a destination; releasing, by a first controller of the UAV carrier, the UAVs from the UAV carrier; and for each UAV of the UAVs: activating, by a second controller of the respective UAV, at least one of the motors of the respective UAV, after the release of the respective UAV from the UAV carrier and upon fulfilment of one or more conditions, thereby generating, by one or more motors of the respective UAV, directly or indirectly, a lift, lifting the respective UAV; wherein the conditions include one or more of the following: (a) that each of the UAVs further comprises an accelerometer, and that readings of the accelerometer indicate that the respective UAV reaches a terminal velocity, (b) that each of the UAVs further comprises an altimeter, and that the readings of the altimeter indicate that the respective UAV reached a given altitude, (c) that each of the UAVs has an armed state and a disarmed state, and that the respective UAV is in the armed state, and (d) that each of the UAVs further comprises a distance sensor, capable of measuring a distance between the respective UAV and the UAV carrier, and that the readings of the distance sensor indicate that the respective UAV reached a given distance from the UAV carrier.

8. The method according to claim 7, wherein at least one of the conditions is that a pre-determined time passed since the UAV was released from the UAV carrier.

9. The method according to claim 7, wherein each of the UAVs further comprises a mechanical safety catch, connected to a first end of a cable connected to the UAV carrier at a second end of the cable, so that the release of the respective UAV causes the cable to stretch and release the mechanical safety catch and wherein at least one of the conditions is that the mechanical safety catch is released.

10. The method according to claim 7, wherein: (a) the UAVs are connected to the UAV carrier via one or more interface connections controlled by the first controller, (b) the UAVs are released by the first controller decoupling the interface connection, and (c) upon the interface connection being coupled the second controller prevents activation of the motors.

11. A non-transitory computer readable storage medium having computer readable program code embodied therewith, the computer readable program code, executable by at least one processor of a computer to perform a method of: carrying, by a UAV carrier, one or more Unmanned Aerial Vehicles (UAVs) from an origin to a destination; releasing, by a first controller of the UAV carrier, the UAVs from the UAV carrier; and for each UAV of the UAVs: activating, by a second controller of the respective UAV, at least one of the motors of the respective UAV, after the release of the respective UAV from the UAV carrier and upon fulfilment of one or more conditions, thereby generating, by one or more motors of the respective UAV, directly or indirectly, a lift, lifting the respective UAV; wherein the conditions include one or more of the following: (a) that each of the UAVs further comprises an accelerometer, and that readings of the accelerometer indicate that the respective UAV reaches a terminal velocity, (b) that each of the UAVs further comprises an altimeter, and that the readings of the altimeter indicate that the respective UAV reached a given altitude, (c) that each of the UAVs has an armed state and a disarmed state, and that the respective UAV is in the armed state, and (d) that each of the UAVs further comprises a distance sensor, capable of measuring a distance between the respective UAV and the UAV carrier, and that the readings of the distance sensor indicate that the respective UAV reached a given distance from the UAV carrier.

* * * * *